(12) United States Patent
Hamilton, II et al.

(10) Patent No.: US 8,365,076 B2
(45) Date of Patent: Jan. 29, 2013

(54) SYSTEM FOR CONCURRENTLY MANAGING MULTIPLE AVATARS

(75) Inventors: Rick A. Hamilton, II, Charlottesville, VA (US); Brian O'Connell, Cary, NC (US); Clifford A. Pickover, Yorktown Heights, NY (US); Anne R. Sand, Peyton, CO (US); Keith R. Walker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 912 days.

(21) Appl. No.: 12/136,276

(22) Filed: Jun. 10, 2008

(65) Prior Publication Data

US 2009/0307620 A1   Dec. 10, 2009

(51) Int. Cl.
  *G06F 3/048*  (2006.01)
(52) U.S. Cl. .......................... 715/706; 715/757
(58) Field of Classification Search .............. 705/27.2; 715/706, 751, 753, 757, 764
  See application file for complete search history.

(56) References Cited

U.S. PATENT DOCUMENTS

| | | | | |
|---|---|---|---|---|
| 6,476,830 B1 * | 11/2002 | Farmer et al. | ............... | 715/769 |
| 7,675,519 B2 * | 3/2010 | Tobias | ............... | 345/473 |
| 7,720,733 B2 * | 5/2010 | Jung et al. | ............... | 705/35 |
| 7,792,801 B2 * | 9/2010 | Hamilton et al. | ............... | 707/655 |
| 7,921,128 B2 * | 4/2011 | Hamilton et al. | ............... | 707/758 |
| 7,937,314 B2 * | 5/2011 | Jung et al. | ............... | 705/37 |
| 2006/0123351 A1 * | 6/2006 | Littlefield | ............... | 715/768 |
| 2006/0258462 A1 | 11/2006 | Cheng et al. | | |
| 2007/0160961 A1 * | 7/2007 | Lum | ............... | 434/29 |
| 2009/0199095 A1 * | 8/2009 | Nicol et al. | ............... | 715/704 |
| 2009/0235331 A1 * | 9/2009 | Dawson et al. | ............... | 726/4 |
| 2009/0318224 A1 * | 12/2009 | Ealey | ............... | 463/31 |

OTHER PUBLICATIONS

Owen Fernando, Guo Saito, Uresh Duminduwardena, Yoshie Tanno, and Michael Cohen. "Cloning and Teleporting Avatars Across Workstations and Mobile Devices in Collaborative Virtual Environments: Clipboard Operations for Virtual Reality". Dec. 15-18, 2005. Proceedings of the International Conference on Information and Automation, p. 133-40.*

* cited by examiner

*Primary Examiner* — Rashawn Tillery
(74) *Attorney, Agent, or Firm* — William E. Schiesser; Hoffman Warnick LLC

(57) ABSTRACT

An approach for cloning and merging avatars that are online in a virtual universe is described. In one embodiment, there is an avatar identification component which is configured to create an identification number associated with a second avatar, a GUI partitioning component configured to partition the graphic user interface of a virtual universe, an avatar rendering component configured to render a second avatar, a communication channel component configured to manage the second avatar's communication channel, and an inventory management component configured to manage the second avatar's inventory.

22 Claims, 7 Drawing Sheets

US 8,365,076 B2

SYSTEM FOR CONCURRENTLY MANAGING MULTIPLE AVATARS

FIELD OF THE INVENTION

This invention relates generally to virtual universes, and more specifically to increasing the performance of virtual universes by allowing a user to create multiple instantiations, or clones, of an avatar at any time.

BACKGROUND OF THE INVENTION

Virtual universes are computer-based simulated environments intended for its users to inhabit, traverse, and interact via avatars, which are personas or representations of the users of the virtual universes, and generally take the form of two-dimensional or three-dimensional human or fantastical representations of a person's self. Virtual universes, also referred to as metaverses, virtual worlds, or "3-D Internet," are now most common in massive multiplayer online games, such as Second Life (a trademark of Linden Research, Inc. in the U.S., other countries or both), the Sims Online (a trademark of Electronic Arts Inc. in the U.S., other countries, or both), and World of Warcraft (a trademark of Blizzard Entertainment, Inc. in the U.S., other countries, or both). Avatars in these types of virtual universes, which can number well over a million, have a wide range of business and social experiences.

Current uses of virtual universe environments enable the use of an avatar to represent only one human user, and allow only one instantiation of an avatar, thus allowing each avatar to be in only one location at a time. Users are also only able to control one avatar at a time. Current means of controlling avatars therefore result in an inefficient method of interacting in a virtual universe, and high labor costs associated with, for example, customer service delivery in a virtual universe.

SUMMARY OF THE INVENTION

A method, tool, and computer readable medium storing computer instructions is provided, for allowing a single user to control multiple avatars, thereby reducing human labor costs in environments such as customer service by improving efficiency and minimizing time and labor devoted to setting up a new account and avatar.

In a first embodiment, a method is taught for creating multiple instantiations of a first avatar in a virtual universe. In this embodiment, the method comprises: expressing a desire to clone the first avatar; creating an identification number associated with a second avatar, wherein the second avatar is a clone of the first avatar; partitioning a graphic user interface in the virtual universe to create a second graphic user interface; rendering the second avatar; and creating a communications channel for the second avatar.

In a second embodiment, an avatar management tool is taught for managing a plurality of avatars in a virtual universe, comprising an avatar creation component configured to create a second avatar, wherein the creation component includes: an avatar identification component configured to create an identification number associated with a second avatar, wherein the second avatar is a clone of the first avatar; a partitioning component configured to partition a graphic user interface in the virtual universe to create a second graphic user interface; an avatar rendering component configured to render the second avatar; and a communications channel creation component configured to create a communications channel for the second avatar.

In a third embodiment, a computer-readable medium storing computer instructions is taught. When executed, the computer-readable medium storing computer instructions enables a computer system to manage multiple instantiations of a first avatar that are online in a virtual universe, the computer instructions comprising: expressing a desire to clone the first avatar; creating an identification number associated with a second avatar, wherein the second avatar is a clone of the first avatar; partitioning a graphic user interface in the virtual universe to create a second graphic user interface; rendering the second avatar; and creating a communications channel for the second avatar.

DETAILED DESCRIPTION OF THE INVENTION

Embodiments of this invention are directed to a technique for cloning, or splintering, avatars to allow them to exist in multiple environments simultaneously, without requiring individual control of avatars at a ratio of one avatar to one human user. The embodiments of this invention can overcome inefficiencies inherent in the prior art by cloning, or splintering, avatars, and allowing multiple instantiations of an avatar to exist in multiple locations and be controlled at the same time by a single human user.

Figure 1:
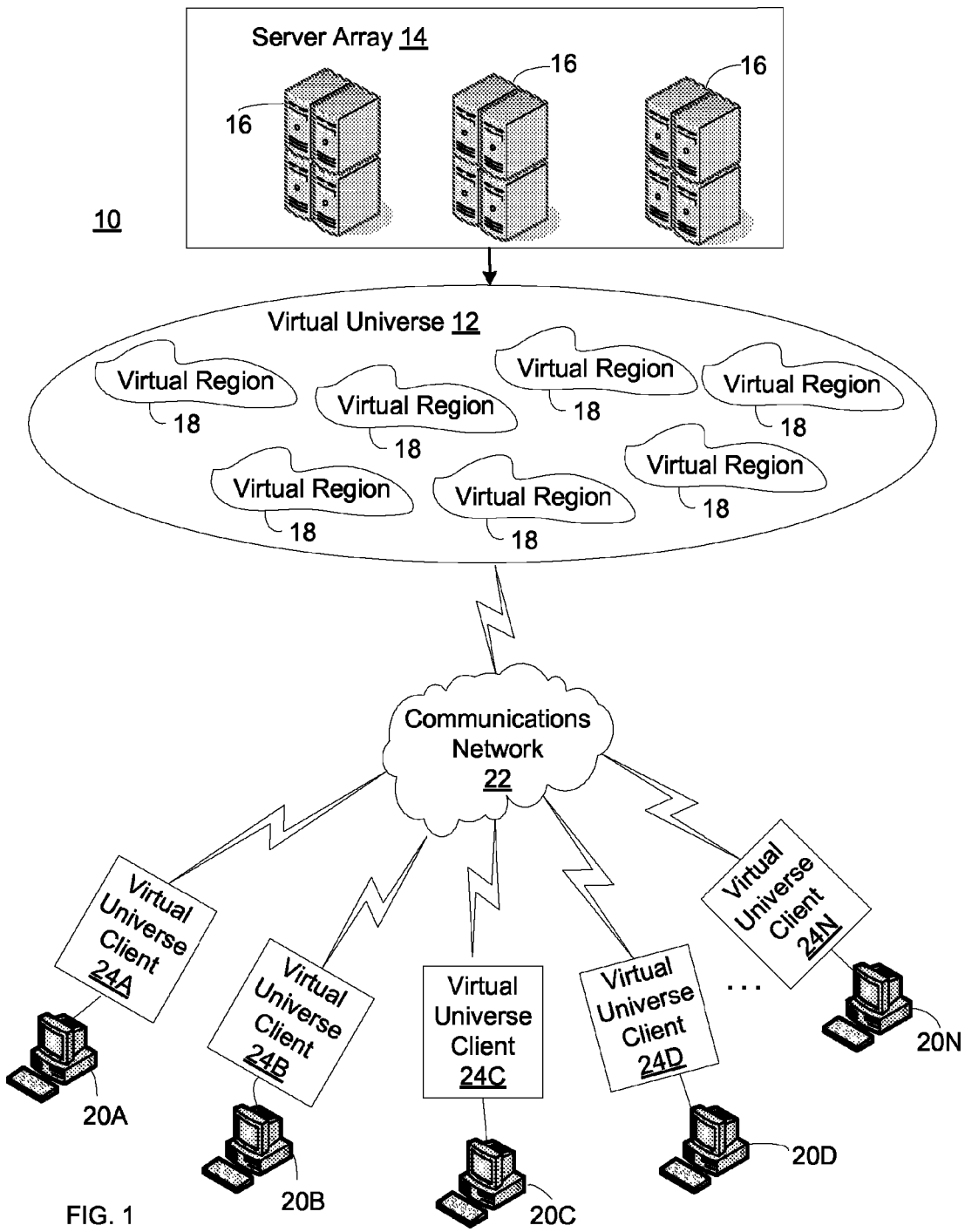
FIG. 1 shows a high-level schematic diagram showing a networking environment for providing a virtual universe according to one embodiment of this invention.

FIG. 1 shows a high-level schematic diagram showing a networking environment 10 for providing a virtual universe 12 according to one embodiment of this invention in which a service for creating and managing multiple instantiations of an avatar can be utilized. As shown in FIG. 1, the networking environment 10 comprises a server array or grid 14 comprising a plurality of servers 16 each responsible for managing a region of virtual geography within the virtual universe 12. A virtual universe provided by a typical massive multiplayer online game can employ thousands of servers to manage all of the virtual real estate. The content of the virtual real estate that is managed by each of the servers 16 within the server array 14 shows up in the virtual universe 12 as a virtual region 18. Like the real-world, each virtual region 18 within the virtual universe 12 comprises a living landscape having things such as buildings, stores, clubs, sporting arenas, parks, beaches, cities and towns all created by residents of the universe that are represented by avatars. These examples of items are only illustrative of some things that may be found in a virtual region and are not limiting. Furthermore, the number of virtual regions 18 shown in FIG. 1 is only for illustration purposes and those skilled in the art will recognize that there may be many more regions found in a typical virtual universe. FIG. 1 also shows that users operating computers 20A-20N (hereinafter referred generally as 20) interact with the virtual universe 12 through a communication network 22 via virtual universe clients 24A-24N (hereinafter referred generally as 24) that resides in the computers, respectively. Below are further details of the virtual universe 12, server array 14, and virtual universe client 24.

Figure 2:
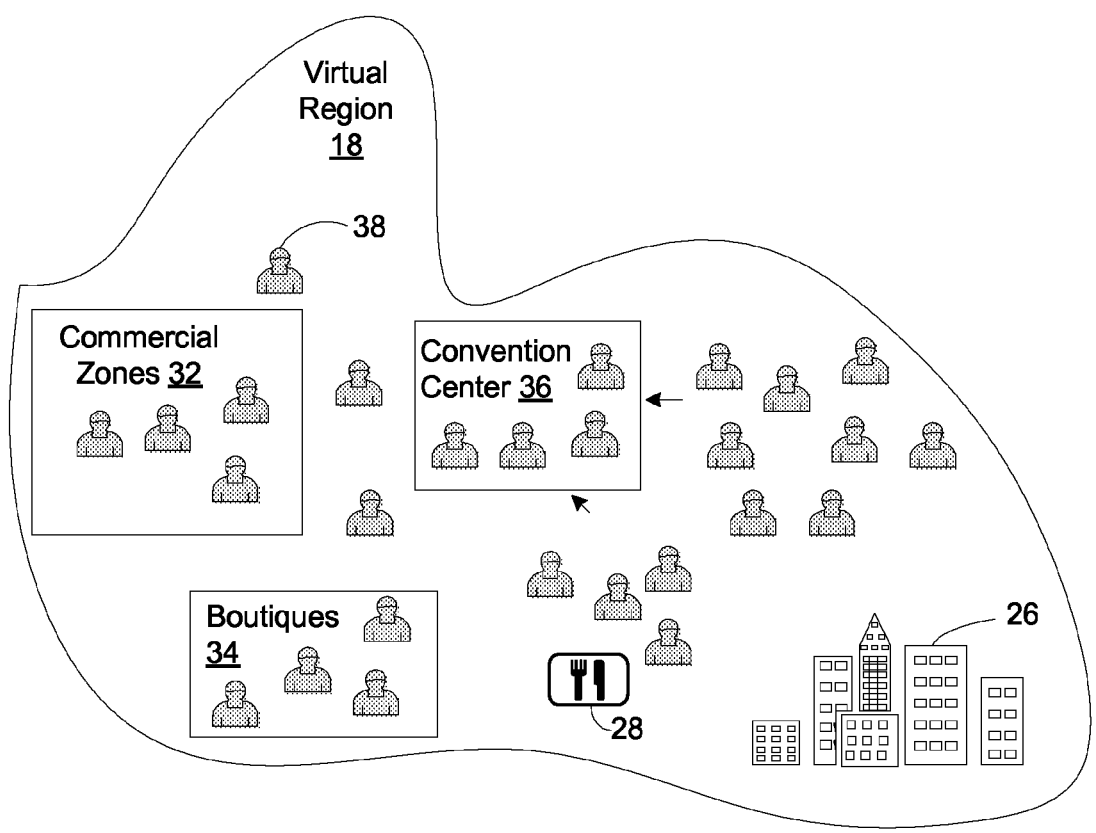
FIG. 2 shows a more detailed view of a virtual region shown in the virtual universe of FIG. 1 with multiple instantiations of an avatar formed according to one embodiment of this invention.

FIG. 2 shows a more detailed view of what one virtual region 18 shown in the virtual universe 12 of FIG. 1 may comprise. As an example, the virtual region 18 shown in FIG. 2 comprises a downtown office center 26, restaurants 28, commercial zones 32, boutiques 34 for shopping, and a convention center 36 for meetings and various conventions. These examples of items in the virtual region 18 shown in FIG. 2 are only illustrative of some things that may be found in a virtual region and those skilled in the art will recognize that these regions can have many more items that can be found in a real-life universe as well as things that do not presently exist in real life.

Figure 3:
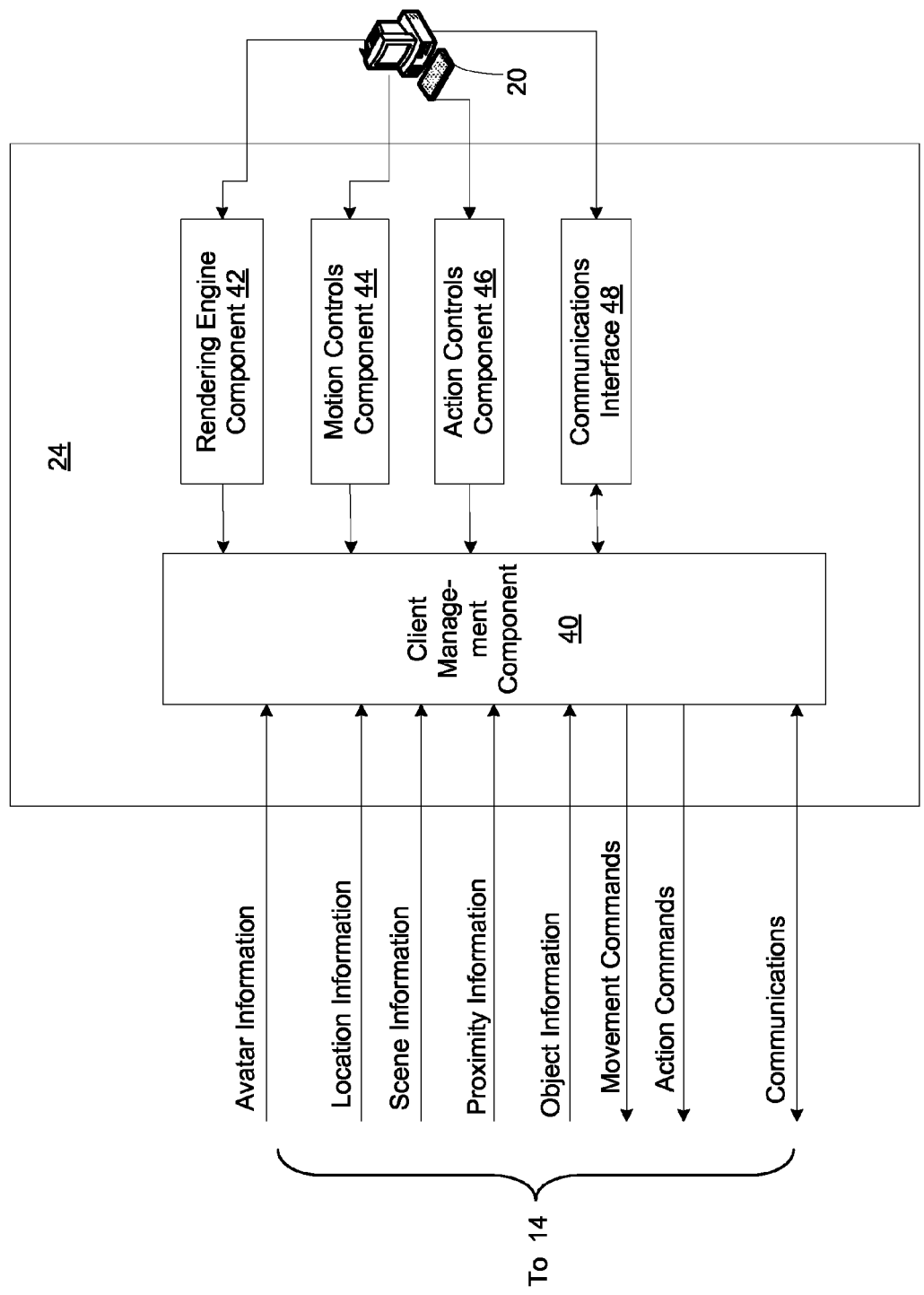
FIG. 3 shows a more detailed view of the virtual universe client shown in FIG. 1.

Residents or avatars 38, which as mentioned above are graphic representations of the users of the virtual universe, roam all about the virtual region by walking, driving, flying, or teleportation, which refers to transportation by essentially moving through space from one point to another, more or less instantaneously. These examples of items in the virtual region 18 shown in FIG. 2 are only illustrative of some things that may be found in a virtual region and those skilled in the art will recognize that these regions can have many more items that can be found in a real-life universe as well as things that do not presently exist in real life FIG. 3 shows a more detailed view of the virtual universe client 24 shown in FIG. 1. The virtual universe client 24, which enables users to interact with the virtual universe 12, comprises a client management component 40, which manages actions, movements, and communications made by a user through computer 20, as well as information received from the virtual universe through the server array 14. A rendering engine component 42 enables the user of the computer 20 to visualize his or her avatar within the surroundings of the particular region of the virtual universe 12 that it is presently located. In addition, the rendering engine 42 enables the user to visualize a clone of the user's avatar which may be created according to this invention.

A motion controls component 44 enables the user to make movements through the virtual universe. In one embodiment, movements through the virtual universe can include, for example, making gestures, changing postures, walking, running, driving, flying, etc.

An action controls component 46 enables the user to perform actions in the virtual universe such as buying items for his or her avatar or even for their real-life selves, building homes, planting gardens, etc., as well as changing the appearance of their avatar. These actions are only illustrative of some possible actions that a user can perform in the virtual universe and are not limiting of the many possible actions that can be performed.

A communications interface 48 enables a user to communicate with other users of the virtual universe 12 through modalities such as chatting, instant messaging, gesturing, talking, sending electronic mail (e-mail), and signaling to indicate the avatar's present location and status in the virtual universe. In addition, the communications interface 48 enables multiple instantiations, or clones, of an avatar to communicate with each other by chatting, instant messaging, gesturing, talking and e-mailing, and signaling. In one embodiment, communications between clones of a single avatar may be broadcast to each of the clones. In another embodiment, the communications may be performed as a push of information from the master clone to the clones according to a hierarchical tree, as is described further below.

FIG. 3 shows the various information that may be received by the client management component 40 from the virtual universe through the server array 14. In particular, the client management component 40 receives avatar information about the avatars that are in proximity to the user's avatar. Other avatar information that may be sent to the client management component 40 includes information that pertains to the multiple clones of an avatar such as movements, actions performed by each clone of the avatar.

In addition, the client management component 40 receives location information about the area that the user's avatar is near (e.g., what region he or she is in) as well as scene information (e.g., what the avatar sees). The client management component 40 also receives proximity information which contains information on what the user's avatar is near and object information, which includes information that can be obtained by one's senses (e.g., touch, taste, smell, etc.,) and what actions are possible for nearby objects (e.g., postures, movements, etc.).

FIG. 3 also shows the movement commands and action commands that are generated by the user that are sent to the server array via the client management component 40, as well as the communications that can be sent to the users of other avatars within the virtual universe.

Figure 4:
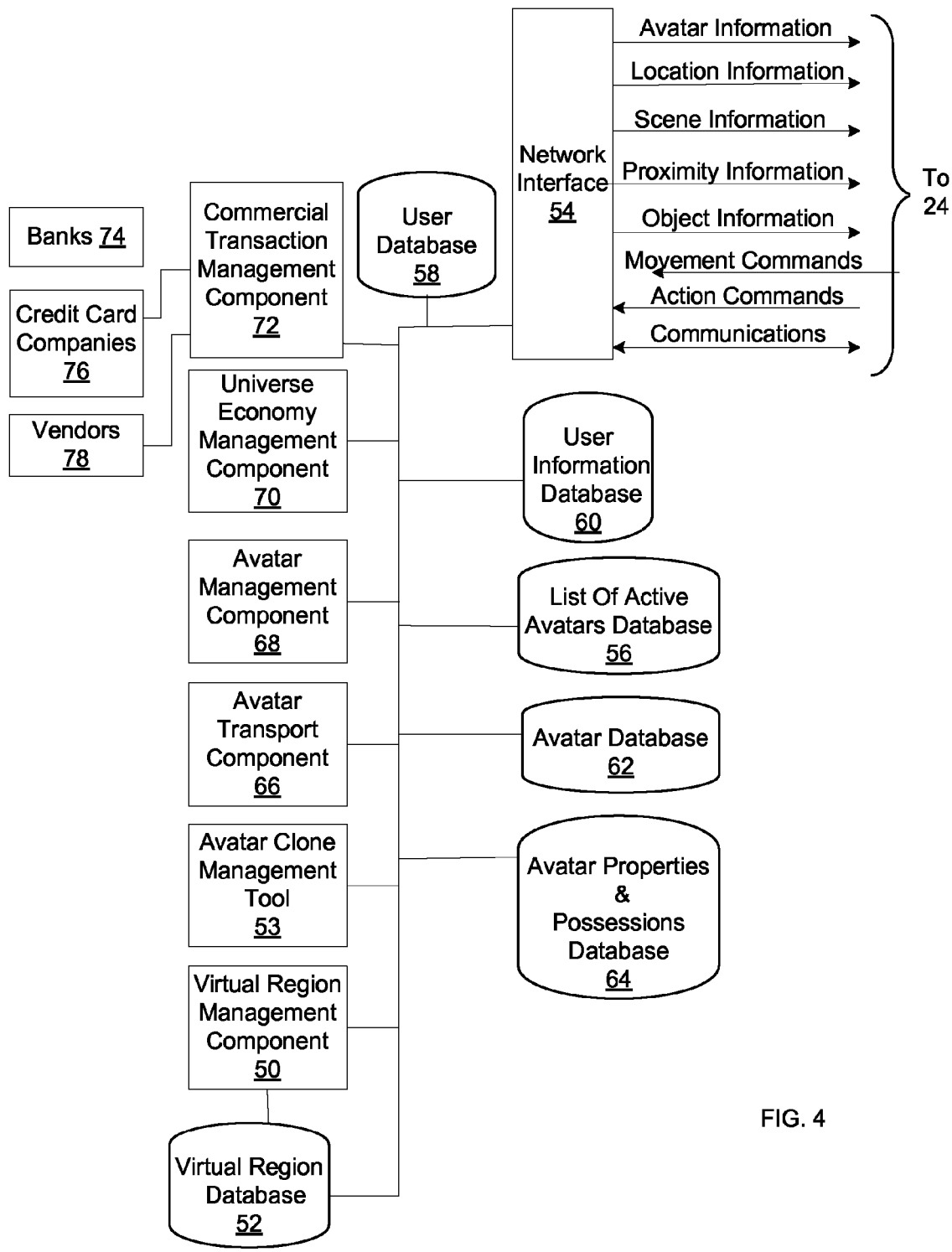
FIG. 4 shows a more detailed view of some of the functionalities provided by the server array shown in FIG. 1.

FIG. 4 shows a more detailed view of some the functionalities provided by the server array 14 shown in FIG. 1. In particular, FIG. 4 shows a virtual region management component 50 that manages a virtual region within the virtual universe 12. In particular, the virtual region management component 50 manages what happens in a particular region such as the type of landscape in that region, the density and particulars of homes, commercial zones, boutiques, streets, parks, restaurants, etc. For example, the virtual region management component 50 would allow the owner of a particular region or establishment within the region to specify requirements for entering or remaining within the region that could potentially affect certain avatar characteristics. In addition, the virtual region management component 50 would allow the owner of a particular region or establishment to provide a textual description that describes the area in more detail so that the avatar can ascertain if there will be a potential effect on their avatar characteristics. Those skilled in the art will recognize that the virtual region management component 50 can manage many other items within the virtual region.

A virtual region database 52 stores information on all of the items in the virtual region 18 that the virtual region management component 50 is managing. In one embodiment, for very large virtual universes, one server 16 may be responsible for managing one particular virtual region 18 within the universe. In other embodiments, it is possible that one server 16 may be responsible for handling one particular island within the virtual region 18.

An avatar clone management tool 53 provides the capability to clone a selected avatar that is online. The selected avatar may be either a master avatar or a previously-cloned instantiation of the master avatar. Once the cloned avatars have been formed, the avatar clone management tool 53 has the capability to permit the clones of an avatar to communicate among themselves without other avatars in that particular virtual region hearing or viewing their communications. Below is a more detailed discussion of the avatar clone management tool 53 and how it forms and unforms avatar clones, as well as a discussion on how the avatar clone management tool 53 enables control of actions, communications, etc.

FIG. 4 shows a network interface 54 that enables the server array 14 to interact with the virtual universe client 24 residing on computer 20. In particular, the network interface 54 communicates information that includes information pertaining to avatars and their clones, location, scene, proximity and objects to the user through the virtual universe client 24 and receives movement and action commands as well as communications from the user via the universe client.

As shown in FIG. 4, there are several different databases for storing information. In particular, database 56 contains a list of all the avatars that are online in the virtual universe 12. In addition, database 56 contains information on avatar clones, including the master avatars and their existing clones. Databases 58 and 60 contain information on the actual human users of the virtual universe 12. In one embodiment, database 58 contains general information on the users such as names, addresses, interests, ages, etc., while database 60 contains more private information on the users such as email addresses and billing information (e.g., credit card information) for taking part in transactions. Databases 62 and 64 contain information on the avatars of the users that reside in the virtual universe 12. In one embodiment, database 62 contains information such as all of the avatars that a user may have, the profile of each avatar, and avatars' characteristics (e.g., appearance, voice, and movement features) while database 64 contains an inventory listing properties and possessions that each avatar owns such as houses, cars, sporting equipment, appearance, attire, etc. Those skilled in the art will recognize that databases 58-64 may contain additional information if desired. Although the above information is shown in FIG. 4 as being stored in databases, those skilled in the art will recognize that other means of storing information can be utilized.

An avatar transport component 66 enables avatars, both master and clones, to transport, which, as mentioned above, allows avatars to transport through space from one point to another point, instantaneously. For example, an avatar or a group of avatars could go individually or collectively to a board meeting or into a store or boutique in another location or region within the virtual universe.

An avatar management component 68 keeps track of what online avatars are doing while in the virtual universe. For example, the avatar management component 68 can track where the avatar presently is in the virtual universe, what activities it is performing or has recently performed. An illustrative but non-exhaustive list of activities can include shopping, eating, talking, recreating, etc.

Because a typical virtual universe has a vibrant economy, the server array 14 has functionalities that are configured to manage the economy. In particular, a universe economy management component 70 manages transactions that occur within the virtual universe between avatars. In one embodiment, the virtual universe 12 will have their own currency that users pay for with real-life money. The users can then take part in commercial transactions for their avatars through the universe economy management component 70. In some instances, the user may want to take part in a commercial transaction that benefits him or her and not their avatar. In this case, a commercial transaction management component 72 allows the user to participate in the transaction. For example, while walking around a commercial zone, an avatar may see a pair of shoes that he or she would like for themselves and not their avatar. In order to fulfill this type of transaction and others similarly related, the commercial transaction management component 72 interacts with banks 74, credit card companies 76 and vendors 78 could be used to facilitate such a transaction.

Although not expressly shown in FIG. 4, all of the components shown in the figure are configured to interact with each other. The components that are shown as being interconnected are illustrated in that manner to convey the close interactions that exist between these components such as the banks 74, credit card companies 76, and vendors with the commercial transaction management component 72.

Figure 5:
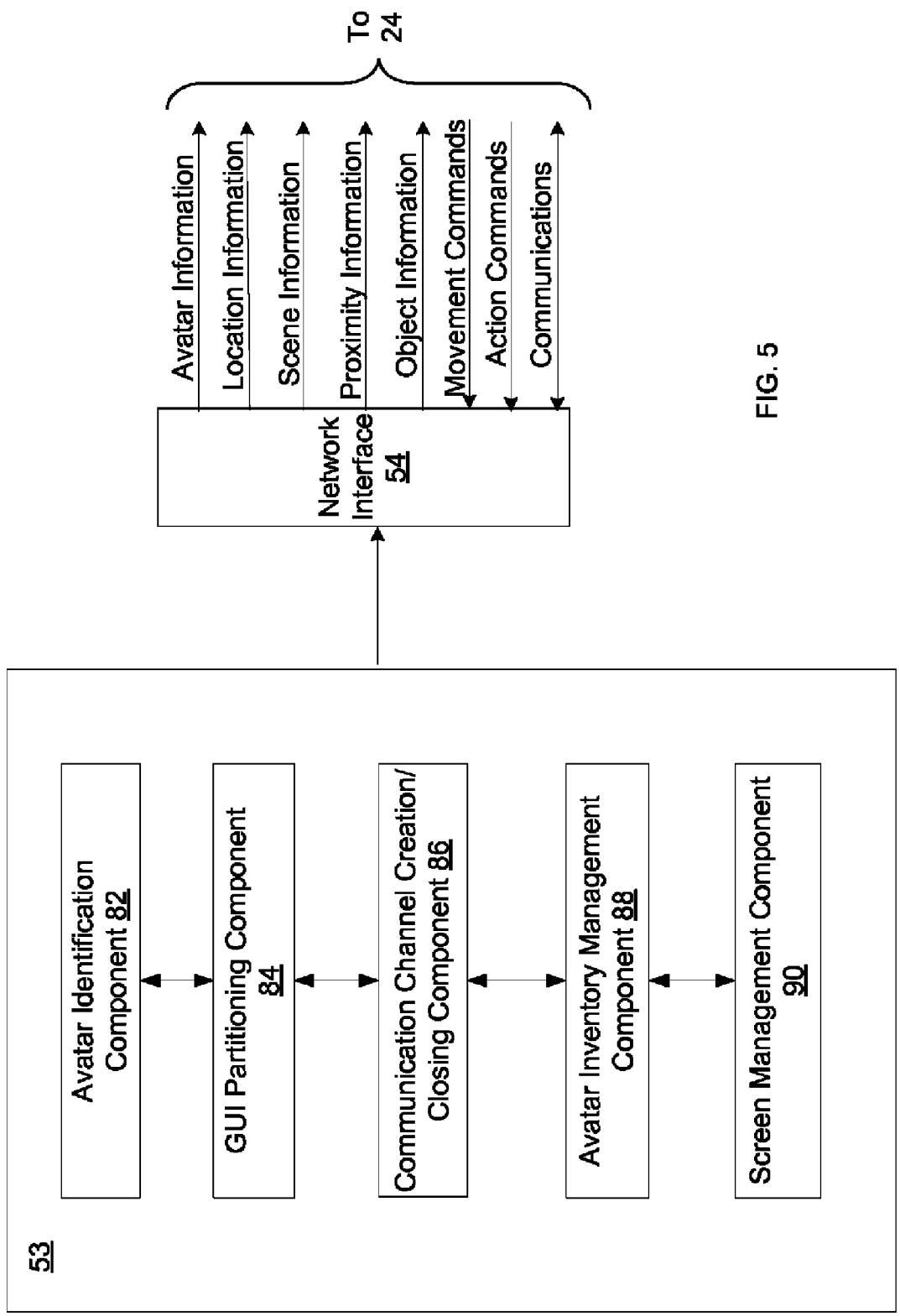
FIG. 5 shows a more detailed view of an avatar clone management tool shown in FIG. 4 according to one embodiment of this invention.

FIG. 5 shows a more detailed view of the avatar clone management tool 53 shown in FIG. 4 according to one embodiment of this invention. As mentioned above, the avatar clone management tool 53 provides the capability to create and merge, or un-form, multiple instantiations of an avatar. As shown in FIG. 5, in one embodiment, the avatar clone management tool 53 resides on a computer system that is a part of the server array 14 and communicates directly to the virtual universe and its residents via the virtual universe client 24. In other embodiments, the avatar clone management tool 53 might reside on the virtual universe client, or reside on separate computers in direct communication with the virtual universe servers 16 and universe clients 24. Accordingly, the teachings of this invention may apply to multiple avatar instantiations within a single client code installation, or across multiple client code installations.

The avatar clone management tool 53 comprises an avatar identification component 82 that identifies avatars that are online in the virtual universe. When a clone of an avatar is to be created according to an embodiment of the invention disclosed herein, avatar identification component 82 creates a unique identification number to be associated with a newly-formed clone. In one embodiment, this identification number is created upon the expression of the user's desire to clone an avatar. An avatar's user can express a desire for cloning by using right click actions through its mouse. Those skilled in the art will recognize that other techniques can be used to express a desire to clone avatars. For example, there may be an option in a pull-down menu that allows one to perform a clone creation, or on-screen radial buttons may be used to perform the cloning. A user may further express a desire to clone an avatar by right clicking either on a master avatar or on an already-formed clone of a master avatar.

GUI partitioning component 84 is configured to partition the graphic user interface screen in the virtual universe, thus accommodating a clone of an avatar such that the user can control an avatar and its clone simultaneously. Rendering engine component 42, part of virtual universe client 24, then renders the avatar clone in the partitioned graphic user interface.

Communication channel component 86 is configured to create a dedicated communication channel for the avatar clone. In one embodiment, clones may communicate using various modes of communication, as described previously, including sending signals to either the master avatar or to other clones, indicating their current location in the virtual universe and their status. In various embodiments, communications may be initiated as a query by the master clone, and either broadcast to all clones, or disseminated as a push of information.

Avatar inventory management component 88 is configured to create and manage clones' inventories. In one embodiment, each clone is formed having an individual inventory of properties and possessions. In another embodiment, a plurality of clones may be formed sharing a single inventory. In a further embodiment, avatar inventory management component 88 may optionally create a sub-inventory container for an avatar clone.

Clones may be formed with varying degrees of common traits, relative to a master avatar. In one embodiment, a clone may be formed with all of the characteristics of the master avatar. For example, a clone of a master customer service representative avatar may include all of the characteristics, inventory items, and capabilities of the master. In another embodiment, a clone may be formed with a restricted subset of the characteristics of the master, for example, a clone of a master customer service representative, which may be managed by a department manager human user, may only have a subset of the characteristics, inventory items, and capabilities of the master. In this embodiment, the clone may have the capability to request the master to grant an inventory item or other characteristic if the clone requires it.

Management of clone movement may be accomplished according to several embodiments using motion and action controls 44 and 46. In one embodiment, a plurality of avatars may be simultaneously and collectively controlled by a user. This collective control may include features such as enabling a specific movement, enabling text messaging, enabling speech, or enabling any other action in multiple avatars. In another embodiment, a user may control each avatar individually. Further, either multiple users or a single individual may control each of multiple avatar clones.

In a further embodiment, a master avatar may impose restrictions on actions and movements which clones may make, and regions in the virtual universe which the clones may move in and between. As an example, with regard to FIG. 2, a retail sales representative avatar clone's movements may be restricted to the geographic region of boutique 34.

In a further embodiment, communication signals sent out via communication interface 48 by each of the avatars may result in automatic adjustments to the movements or behaviors of other avatars in the virtual universe. One example of such an automatic adjustment could include a situation in which it is desirable to maintain an equal distribution of avatar clones in an area in the virtual universe, wherein a clone's signal may cause any clone avatars within a set radius to move away from the signaling clone. In another possible example, a clone may signal to other avatar clones requesting that they all gather in an area. In yet another possible example, a retail sales representative avatar clone may send a signal to other avatars indicating that the clone is in an area with many potential customers, causing other avatars to move toward that location. These examples of signaling applications are only illustrative, and are not intended to provide an exhaustive list of possible applications for movement management.

In various embodiments, clones may be created such that they are either ephemeral or permanent. In an embodiment in which the clones are ephemeral, or transient, pre-set conditions chosen by the user may facilitate the automatic creation and deletion of a clone avatar. As an example, a condition may dictate that an ephemeral clone of a customer service representative avatar be created when a customer enters boutique 34. The ephemeral clone may be automatically deleted upon the departure of the customer from boutique 34 in virtual region 18. In another embodiment, a clone may be created in response to a request from either the master avatar or another avatar. For example, a clone of a customer service representative avatar may be created in response to a request from either a master customer service manager avatar, or from a customer.

Clones may either be created according to a model in which clones are peers of the avatar from which they were created, or they may be created in a master/clone model with inheritance. In an embodiment according to a master/clone model, a first instantiation of an avatar is designated the master. Any subsequent instantiations of the master are designated as clones, and relationships between the instantiations are maintained according to a hierarchy tree. In this embodiment, any subsequent changes to the characteristics, inventory, appearance, etc., of the master are propagated to the clones automatically. Similarly, any changes to the characteristics of a clone of the master may be propagated downward to its clones, but not upward to the master. For example, a master clone may have a first and a second clone, each of which may have a plurality of leaf clones formed therefrom. A change to the first clone would be propagated down to all leaf clones created from the first clone, but not propagated up to the master or to the branch of the second clone.

In one embodiment, screen management component 90 is configured to manage incoming images associated with each of the instantiations of an avatar at a given time. Incoming images are multiplexed and displayed for the user on the user's screen. The user may manage the graphic focus for avatar communications by selecting one of the avatar clones with a mouse, for example. In one embodiment, each of the images may be displayed in a separate full screen window.

Figure 6:
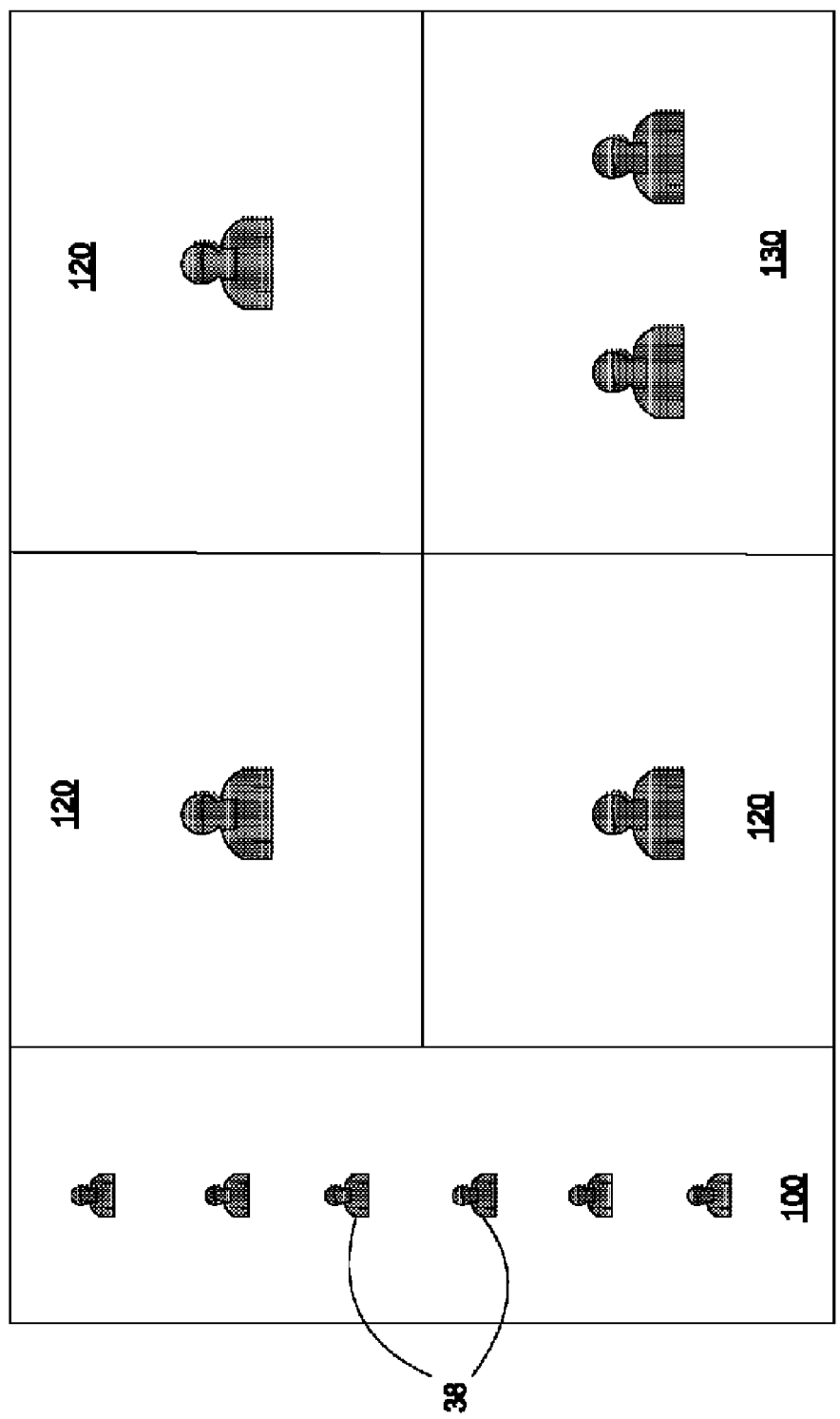
FIG. 6 shows an example of an avatar management console according to one embodiment.

FIG. 6 depicts another embodiment, in which each of the images may be displayed on tiled screens. In this embodiment, the number of tiles may be determined by the number of avatars requiring the user's attention. For example, if a user is controlling six instantiations of an avatar, and only four require the user's attention at a given time, the screen may be split into four tiled panes at that time.

As further depicted in FIG. 6, an additional embodiment is shown in which pane 130 includes two instantiations of an avatar, while panes 120 only include one instantiation of an avatar each. In this embodiment, the geographic proximity of two instantiations of an avatar in the virtual universe informs display and screen splitting. For example, where two avatars are disparate in geographic location, they may be displayed in separate panes 120. As the same two avatars approach each other and enter a minimum distance of one another, the panes 120 may be merged to form a shared pane 130. In an embodiment wherein the instantiations are viewed by the user in tiled screens, this would cause the number of tiles to be decreased by one. This embodiment may also be used in conjunction with the embodiment including separate full screen windows as described above.

In a further embodiment, communications directed toward certain clones or the vicinity thereof may cause the corresponding window or pane 120, 130 to become highlighted. Communications may further be brought to the user's attention, either in voice or text form.

In yet another embodiment, previously assigned or preferred customers may be tagged or identified in order to facilitate bringing these customers to the forefront of the screen dedicated to the avatar clone assigned to assist that customer. Filters may optionally be enabled to show only conversations or queries between the customer and the assigned clone in the respective pane or window.

As discussed above, ephemeral avatar clones may be deleted automatically, according to pre-set conditions as desired by the user. Permanent avatar clones may also be deleted when the human user no longer desires to use them. In one embodiment, an avatar clone is deleted, or de-cloned, by merging the clone into another avatar clone or the master avatar. To merge the clone, a user expresses a desire to merge the clone using methods previously discussed relative to clone creation, for example, right clicking on the clone and selecting an option for merging. In other embodiments, the clone may be merged automatically upon such events as the user logging out of virtual universe 24, or when the inventories of clones other than the master are discarded. In the alternative, clone inventories may also be kept separate from other clones, and available for future invocation and use after logging out.

Avatar inventory management component 88 manages the merger of the clone's inventory into the inventory of the avatar into which it is merging. Any items present in the clone's inventory may be deposited into the avatar's inventory. Communication channel component 86 closes the communication channel for the clone, and rendering engine component 42 (in virtual universe client 24) ceases rendering the clone. GUI partitioning component 84 closes the GUI partition in the virtual universe screen, and avatar identification component 82 de-allocates the identification number previously associated with the clone, to complete deletion or merging of a clone.

In still another embodiment, the methodologies disclosed herein can be used within a computer system to clone avatars that are online in a virtual universe. In this case, the avatar clone management tool 53 can be provided and one or more systems for performing the processes described herein can be obtained and deployed to a computer infrastructure. To this extent, the deployment can comprise one or more of (1) installing program code on a computing device, such as a computer system, from a computer-readable medium; (2) adding one or more computing devices to the infrastructure; and (3) incorporating and/or modifying one or more existing systems of the infrastructure to enable the infrastructure to perform the process actions of the invention.

In another embodiment of this invention, the avatar clone management tool 53 is used as a service to charge fees for each avatar that is cloned. In this embodiment, the provider of the virtual universe or a third party provider could offer this avatar clone management tool as a service by performing the functionalities described herein on a subscription and/or fee basis. In this case, the provider of the virtual universe or the third party service provider can create, deploy, maintain, support, etc., the avatar clone management tool 53 that performs the processes described in the invention. In return, the virtual universe or the third party service provider can receive payment from the virtual universe residents via the universe economy management component 70 and the commercial transaction management component 72.

Figure 7:
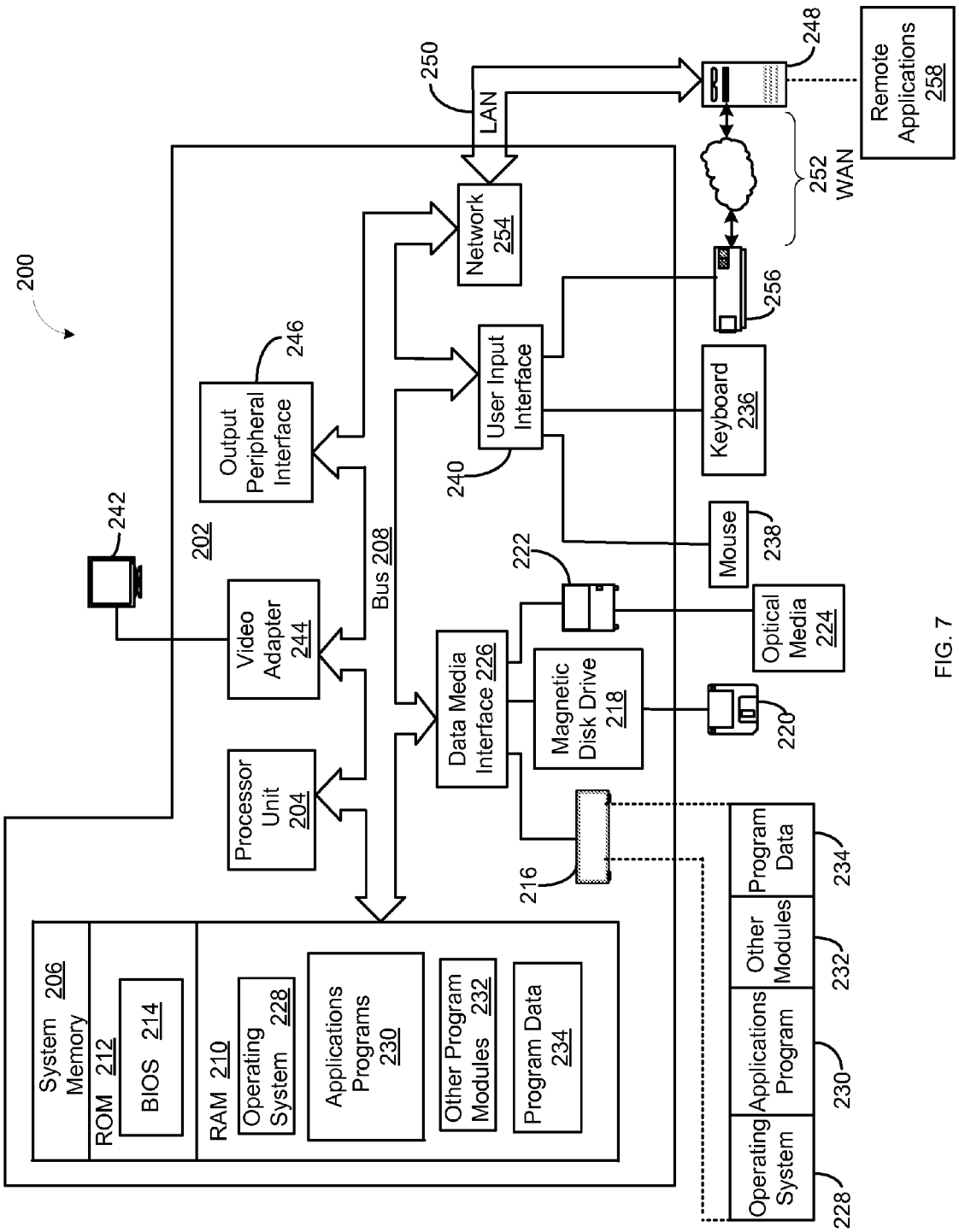
FIG. 7 shows a schematic of an exemplary computing environment in which elements of the networking environment shown in FIG. 1 may operate.

FIG. 7 shows a schematic of an exemplary computing environment in which elements of the networking environment shown in FIG. 1 may operate. The exemplary computing environment 200 is only one example of a suitable computing environment and is not intended to suggest any limitation as to the scope of use or functionality of the approach described herein. Neither should the computing environment 200 be interpreted as having any dependency or requirement relating to any one or combination of components illustrated in FIG. 7.

In the computing environment 200 there is a computer 202 which is operational with numerous other general purpose or special purpose computing system environments or configurations. Examples of well known computing systems, environments, and/or configurations that may be suitable for use with an exemplary computer 202 include, but are not limited to, personal computers, server computers, thin clients, thick clients, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The exemplary computer 202 may be described in the general context of computer-executable instructions, such as program modules, being executed by a computer. Generally, program modules include routines, programs, objects, components, logic, data structures, and so on, that performs particular tasks or implements particular abstract data types. The exemplary computer 202 may be practiced in distributed computing environments where tasks are performed by remote processing devices that are linked through a communications network. In a distributed computing environment, program modules may be located in both local and remote computer storage media including memory storage devices.

As shown in FIG. 7, the computer 202 in the computing environment 200 is shown in the form of a general-purpose computing device. The components of computer 202 may include, but are not limited to, one or more processors or processing units 204, a system memory 206, and a bus 208 that couples various system components including the system memory 206 to the processor 204.

Bus 208 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer 202 typically includes a variety of computer readable media. Such media may be any available media that is accessible by computer 202, and it includes both volatile and non-volatile media, removable and non-removable media.

In FIG. 7, the system memory 206 includes computer readable media in the form of volatile memory, such as random access memory (RAM) 210, and/or non-volatile memory, such as ROM 212. A BIOS 214 containing the basic routines that help to transfer information between elements within computer 202, such as during start-up, is stored in ROM 212. RAM 210 typically contains data and/or program modules that are immediately accessible to and/or presently operated on by processor 204.

Computer 202 may further include other removable/non-removable, volatile/non-volatile computer storage media. By way of example only, FIG. 7 illustrates a hard disk drive 216 for reading from and writing to a non-removable, non-volatile magnetic media (not shown and typically called a "hard drive"), a magnetic disk drive 218 for reading from and writing to a removable, non-volatile magnetic disk 220 (e.g., a "floppy disk"), and an optical disk drive 222 for reading from or writing to a removable, non-volatile optical disk 224 such as a CD-ROM, DVD-ROM or other optical media. The hard disk drive 216, magnetic disk drive 218, and optical disk drive 222 are each connected to bus 208 by one or more data media interfaces 226.

The drives and their associated computer-readable media provide nonvolatile storage of computer readable instructions, data structures, program modules, and other data for computer 202. Although the exemplary environment described herein employs a hard disk 216, a removable magnetic disk 218 and a removable optical disk 222, it should be appreciated by those skilled in the art that other types of computer readable media which can store data that is accessible by a computer, such as magnetic cassettes, flash memory cards, digital video disks, RAMs, ROM, and the like, may also be used in the exemplary operating environment.

A number of program modules may be stored on the hard disk 216, magnetic disk 220, optical disk 222, ROM 212, or RAM 210, including, by way of example, and not limitation, an operating system 228, one or more application programs 230, other program modules 232, and program data 234. Each of the operating system 228, one or more application programs 230, other program modules 232, and program data 234 or some combination thereof, may include an implementation of the networking environment 10 of FIG. 1 including the server array 14, the virtual universe client 24 and the avatar clone management tool 53. In one embodiment, the one or more application programs 230 include components of the avatar clone management tool 53 such as avatar identification component 82, GUI partitioning component 84, communication channel creation/closing component 86, avatar inventory management component 88, and screen management component 90.

A user may enter commands and information into computer 202 through optional input devices such as a keyboard 236 and a pointing device 238 (such as a "mouse"). Other input devices (not shown) may include a microphone, joystick, game pad, satellite dish, serial port, scanner, camera, or the like. These and other input devices are connected to the processor unit 204 through a user input interface 240 that is coupled to bus 208, but may be connected by other interface and bus structures, such as a parallel port, game port, or a universal serial bus (USB).

An optional monitor 242 or other type of display device is also connected to bus 208 via an interface, such as a video adapter 244. In addition to the monitor, personal computers typically include other peripheral output devices (not shown), such as speakers and printers, which may be connected through output peripheral interface 246.

Computer 202 may operate in a networked environment using logical connections to one or more remote computers, such as a remote server/computer 248. Remote computer 248 may include many or all of the elements and features described herein relative to computer 202.

Logical connections shown in FIG. 7 are a local area network (LAN) 250 and a general wide area network (WAN) 252. Such networking environments are commonplace in offices, enterprise-wide computer networks, intranets, and the Internet. When used in a LAN networking environment, the computer 202 is connected to LAN 250 via network interface or adapter 254. When used in a WAN networking environment, the computer typically includes a modem 256 or other means for establishing communications over the WAN 252. The modem, which may be internal or external, may be connected to the system bus 208 via the user input interface 240 or other appropriate mechanism.

In a networked environment, program modules depicted relative to the personal computer 202, or portions thereof, may be stored in a remote memory storage device. By way of example, and not limitation, FIG. 7 illustrates remote application programs 258 as residing on a memory device of remote computer 248. It will be appreciated that the network connections shown and described are exemplary and other means of establishing a communications link between the computers may be used.

An implementation of an exemplary computer 202 may be stored on or transmitted across some form of computer readable media. Computer readable media can be any available media that can be accessed by a computer. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media.

The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

It is apparent that there has been provided with this invention an approach for managing multiple instantiations of an avatar in a virtual universe. While the invention has been particularly shown and described in conjunction with a preferred embodiment thereof, it will be appreciated that variations and modifications will occur to those skilled in the art. Therefore, it is to be understood that the appended claims are intended to cover all such modifications and changes as fall within the true spirit of the invention.

What is claimed is:

1. A method for creating multiple instantiations of a first avatar in a virtual universe, the method comprising:
   receiving a request to clone the first avatar;
   creating a unique identification number associated with a second avatar, wherein the second avatar is a clone of the first avatar, and wherein the identification number associated with the second avatar is different from an identification number associated with the first avatar;
   partitioning a graphic user interface in the virtual universe to create a second graphic user interface;
   rendering the second avatar in the second graphic user interface;
   creating a communications channel for the second avatar;
   creating a sub-inventory container for the second avatar; and
   managing communications between the first avatar and the second avatar, including managing signaling between the second avatar and the first avatar, to indicate a position or status of one of the first avatar or the second avatar within the virtual universe, wherein the first avatar and the second avatar are simultaneously controlled by a single user, and
   wherein the first avatar and the second avatar communicate with one another, and a third avatar who is not a clone of the first avatar or the second avatar, is unable to hear or view the communications between the first avatar and the second avatar.

2. The method of claim 1, further comprising merging the second avatar with the first avatar when a user is finished using the second avatar, wherein the merging includes:

expressing a desire to merge the second avatar with the first;
merging an inventory of items, wherein the merging further includes managing merging, discarding, and retaining of the second avatar's inventory;
closing the communications channel for the second avatar;
closing the second graphic user interface;
ceasing drawing of the second avatar; and
de-allocating the identification number associated with the second avatar.

3. The method of claim 1, further comprising managing movement of the multiple instantiations of a first avatar separately or collectively.

4. The method of claim 1, further comprising managing a screen, including multiplexing and displaying a plurality of incoming images associated with the plurality of avatars in the same screen.

5. The method of claim 4, wherein the plurality of images is displayed in a plurality of separate full screen windows with one image in each of the plurality of windows.

6. The method of claim 4, wherein the plurality of images is displayed tiled on a screen, and a number of tiles is determined by a number of avatars needing a user's attention, wherein an avatar requires the user's attention when a communication is directed to the avatar or a communication is initiated in the vicinity of the avatar.

7. The method of claim 1, wherein the first avatar is a clone of a master avatar, and the first and second avatars are peers.

8. The method of claim 1, wherein the first avatar is a master avatar, and wherein the second avatar inherits at least a characteristic from the first avatar, and a subsequent change to the characteristic of the first avatar is propagated to the second avatar.

9. The method of claim 1, wherein the creation of the second avatar is initiated by either the first avatar or an avatar other than the first avatar.

10. An avatar clone management tool for managing a plurality of avatars in a virtual universe, comprising:
a computer system comprising at least one computing device including a processing unit and a memory;
an avatar creation component configured to create a second avatar including:
an avatar identification component configured to create a unique identification number associated with a second avatar, wherein the second avatar is a clone of the first avatar, and wherein the identification number associated with the second avatar is different from an identification number associated with the first avatar;
a GUI (graphic user interface) partitioning component configured to partition a graphic user interface in the virtual universe to create a second graphic user interface;
an avatar rendering engine component configured to render the second avatar in the second graphic user interface;
a communications channel component configured to create a communications channel for the second avatar;
a creation component configured to create a sub-inventory container for the second avatar; and
a communications interface configured to manage communications between the first avatar and the second avatar, including managing signaling between the second avatar and the first avatar, to indicate a position or status of one of the first avatar or the second avatar within the virtual universe, wherein the first avatar and the second avatar are simultaneously controlled by a single user, and
wherein the first avatar and the second avatar communicate with one another, and a third avatar who is not a clone of the first avatar or the second avatar, is unable to hear or view the communications between the first avatar and the second avatar.

11. The avatar clone management tool of claim 10, further comprising an avatar merging component configured to merge the second avatar with the first avatar, wherein the merging component includes:
the avatar inventory component further configured to merge an inventory of items, wherein the avatar inventory component is further configured to manage merging, discarding, and retaining of the second avatar's inventory;
the communication channel component further configured to close the communication channel for the second avatar;
the GUI partitioning component further configured to close the second graphic user interface;
the avatar rendering engine component further configured to cease drawing of the second avatar;
the avatar identification component further configured to de-allocate the identification number associated with the second avatar.

12. The avatar clone management tool of claim 10, further comprising a movement control component configured to manage movement of the multiple instantiations of a first avatar separately or collectively.

13. The avatar clone management tool of claim 10, further including a screen management component configured to multiplex and display a plurality of incoming images associated with the plurality of avatars in the same screen.

14. A non-transitory computer-readable medium storing computer instructions, which when executed, enables a computer system to manage multiple instantiations of a first avatar that are online in a virtual universe, the computer instructions comprising:
receiving a request to clone the first avatar;
creating a unique identification number associated with a second avatar, wherein the second avatar is a clone of the first avatar, and wherein the identification number associated with the second avatar is different from an identification number associated with the first avatar;
partitioning a graphic user interface screen in the virtual universe to create a second graphic user interface;
rendering the second avatar in the second graphic user interface;
creating a communications channel for the second avatar; and
managing communications between the first avatar and the second avatar, including managing signaling between the second avatar and the first avatar, to indicate a position or status of one of the first avatar or the second avatar within the virtual universe, wherein the first avatar and the second avatar are simultaneously controlled by a single user, and
wherein the first avatar and the second avatar communicate with one another, and a third avatar who is not a clone of the first avatar or the second avatar, is unable to hear or view the communications between the first avatar and the second avatar.

15. The computer-readable medium of claim 14, further comprising instructions for:
merging an inventory of items;
closing the communications channel for the second avatar;
closing the second graphic user interface;
ceasing drawing of the second avatar; and
de-allocating the identification number associated with the second avatar.

16. The computer-readable medium of claim 14, further comprising instructions for managing inventory, including managing merging, discarding, and retaining of the second avatar's inventory.

17. The computer-readable medium of claim 14, further comprising instructions for managing movement of the multiple instantiations of a first avatar separately or collectively.

18. The computer-readable medium of claim 14, further comprising instructions for managing a screen, including multiplexing and displaying a plurality of incoming images associated with the plurality of avatars in the same screen.

19. The computer-readable medium of claim 14, wherein the multiple instantiations of the avatar are within a single client code installation or across multiple client code installations.

20. The computer-readable medium of claim 14, wherein the multiple instantiations of the avatar exist in multiple environments simultaneously.

21. A method for providing an avatar clone management tool as a service within a virtual universe for facilitating cloning an avatar within the virtual universe, comprising:

deploying the avatar clone management tool in a computer system as a service that is in communication with the virtual universe, wherein the avatar clone management tool is operable to:

receive a request to clone the first avatar;

create a unique identification number associated with a second avatar, wherein the second avatar is a clone of the first avatar, and wherein the identification number associated with the second avatar is different from an identification number associated with the first avatar;

partition a graphic user interface screen in the virtual universe to create a second graphic user interface;

render the second avatar in the second graphic user interface;

create a communications channel for the second avatar; and manage communications between the first avatar and the second avatar, including managing signaling between the second avatar and the first avatar, to indicate a position or status of one of the first avatar or the second avatar within the virtual universe, and wherein the first avatar and the second avatar communicate with one another, and a third avatar who is not a clone of the first avatar or the second avatar, is unable to hear or view the communications between the first avatar and the second avatar, and wherein the first avatar and the second avatar are simultaneously controlled by a single user.

22. The method according to claim 21, wherein the avatar clone management tool is further operable to charge a search fee to a virtual universe service provider of the virtual universe or to the avatar being cloned.

* * * * *